Figure 2:
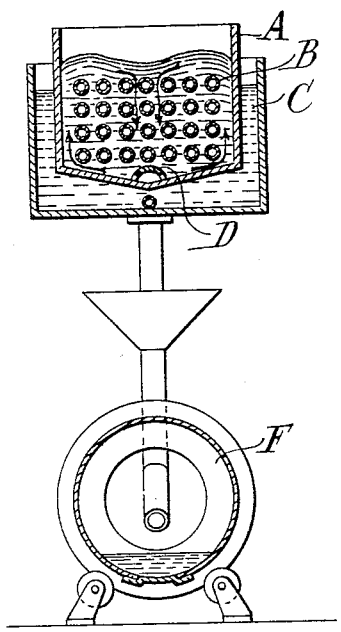

No. 746,016. PATENTED DEC. 8, 1903.
J. H. CAMPBELL.
MILK PRODUCT RESEMBLING CHEESE AND PROCESS OF MAKING SAME.
APPLICATION FILED JAN. 27, 1903.
NO MODEL.

WITNESSES:

INVENTOR:
Joseph H. Campbell,
By Attorneys,

No. 746,016.                                              Patented December 8, 1903.

UNITED STATES PATENT OFFICE.

JOSEPH H. CAMPBELL, OF NEW YORK, N. Y.

MILK PRODUCT RESEMBLING CHEESE AND PROCESS OF MAKING SAME.

SPECIFICATION forming part of Letters Patent No. 746,016, dated December 8, 1903.

Application filed January 27, 1903. Serial No. 140,739. (No specimens.)

*To all whom it may concern:*

Be it known that I, JOSEPH H. CAMPBELL, a citizen of the United States, residing in the borough of Brooklyn, county of Kings, city and State of New York, have invented a certain new and useful Improved Milk Product Resembling Cheese and Process of Making the Same, of which the following is a specification.

It is well known that ordinary cheese as made by the coagulation of the casein by means of rennet is lacking in sugar of milk, large quantities of the sugar being lost in the whey and part of the remainder being transformed into lactic acid, alcohol, and carbon dioxid during ripening, so that in practice seldom more than fifteen per cent. of the original amount of milk-sugar is found in the final product. The ordinary process also results in the loss of a large quantity, averaging about twenty-four per cent., of the proteids of milk, which are carried off in the whey. Furthermore, the coagulated casein is insoluble. The process of obtaining the curd by spontaneous souring of the milk, which forms a much more soluble precipitate than the coagulum produced by rennet, is used to some extent. In this cheese also practically all the milk-sugar and about the same percentage of proteids are lost, as in rennet cheese. It presents certain objectionable features in ripening, which prevent its coming into use to any great extent. With this process also the mineral matters in the milk are lost in the whey.

My invention provides a cheese which contains a large percentage of milk-sugar. Preferably substantially all the sugar of the original milk is retained and appears in the final product largely as sugar and to some extent as fermentation products thereof. Preferably, also, it contains substantially all the proteids of the milk and in as soluble and digestible condition as in the original milk. The cheese may be made with little or no fat, and the proportion of water may be varied within wide limits. The fat when present may be milk-fat or other added fats, such as those used in "filled" or margarin cheese. I preferably include all the fat of the milk, and in such case the principal ingredients will be in substantially the following proportions: milk-fat, twenty parts; proteids, 17.5 parts; milk-sugar, (including its fermentation products,) 22.5 parts; water, twenty to forty parts. The product also preferably contains an added yeast or bacterial matter of a kind to produce the desired flavor. Ordinary cheese is a quite unbalanced food by reason of the excess of proteids and the want of carbo-hydrates, (milk-sugar.) Its indigestibility also to some extent is due to the small quantity of milk-sugar present, which when present in combination with proteids in the stomach burns quickly, and thus furnishes heat at a proper time for starting the digestion of the other elements. By the production of such a cheese as described with the proteids in a soluble condition and the large amount of milk-sugar present I very largely overcome the indigestibility, which is the greatest objection to ordinary cheese. With the specific percentages above stated the proteid of my product furnishes approximately twenty per cent. of the entire heat obtained from the food, which is exactly the proportion required in a perfectly-balanced food. Also the comparatively greater solubility of the casein makes my improved cheese ripen more rapidly than ordinary cheese. For example, ordinary Stilton cheese takes one year to ripen. Similar cheese made according to my invention takes about four months.

My improved product may be obtained by forming a mixture of milk solids, including substantially all the milk-sugar, preferably all the proteids in substantially their original condition as to solubility, without cream or with a desired proportion of cream, with a reduced proportion of water, and ripening this mixture by any usual or suitable process. Preferably to obtain the desired flavor rapidly I add to the mixture before setting it aside to ripen the particular yeast or bacteria which produces the desired flavor. The desired mixture of solids and water may be obtained directly and quickly by evaporating a portion of the water from either whole or skim milk or from milk enriched with an excess of fat. By this evaporating process I avoid one of the most difficult features in cheese-making—namely, the obtaining of the proper amount of water. To expel the water in ordinary cheese-making, it is the custom to use a press which squeezes the water out, and it is largely a matter of guesswork to determine the amount of pressure to be used. The character of the cheese depends on the amount of water nearly as much as it does on the amount of the other constituents. Hard cheese, for example, has comparatively little water. Furthermore, if too high a pressure is used too much water is forced out, generally carrying with it some of the fat. In my process, the amount of water being known and depending on the kind of cheese to be made, it can be easily determined by inspection of the mass when it has reached a proper state of concentration. A simple observation of the degree of liquidity will generally be sufficient; but it can be accurately determined by weighing a known quantity.

It is well known that the evaporation may be performed rapidly and at so low a temperature as to preserve the solubility of the proteids, such a process being explained, for example, in my Patent No. 668,161, and I prefer such a method of evaporation. Briefly described, this method consists in heating the milk to a temperature below the coagulating-point of albumen and simultaneously blowing air through it to carry off the vapor as fast as it is formed. This process also sterilizes the mass, so that when the bacteria culture is added few or no inimical organisms are encountered and a cheese which ripens quickly and with a pure uniform flavor is obtained.

An embodiment of the process is illustrated in the accompanying drawings, the several apparatus in which the mass is treated being indicated more or less diagrammatically.

Figure 1:
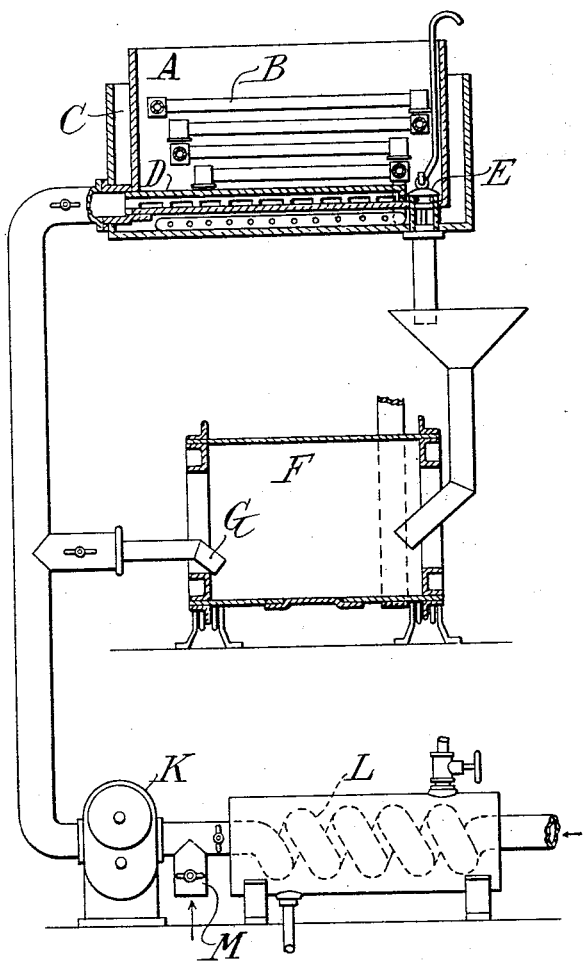
Figure 3:
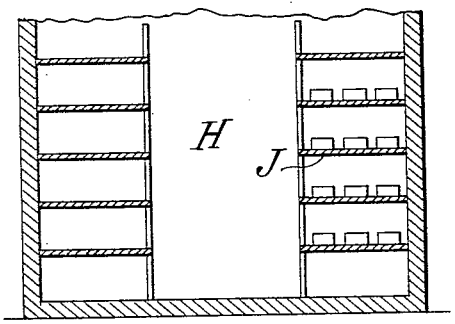

Figure 1 is a longitudinal section through the apparatus for forming the mixture of the desired ingredients. Fig. 2 is a transverse section of the same. Fig. 3 is a section of a curing or ripening room.

With this apparatus the process may be carried out as follows: The milk is placed in the tank A and water at a suitable temperature to maintain the milk preferably between 120° and 140° Fahrenheit is circulated through the internal coils B and the surrounding jacket C. Air is forced into the pipe D, extending along the bottom of the tank, and escapes in the manner indicated by the arrows, Fig. 2, agitating the mass and carrying off the vapor as fast as it is formed, so as to keep the milk at a temperature considerably below that of the heating-surfaces and to produce a rapid evaporation. This action is continued until the mass contains very little more water than is desired in the final product. The concentration may continue until the mass is reduced, for example, to one-fifth or one-sixth its original volume, so that it contains approximately from fifty per cent. to forty per cent. of water. Such a large percentage of water is desirable to facilitate the subsequent ripening. From the tank A by means of a valve E the concentrated milk is passed into a drum F revolving on rollers, as shown, and into this drum is also introduced a culture of the particular yeast or bacteria desired. The temperature is lowered to about 100° Fahrenheit. The rolling of the drum mixes the added ingredients thoroughly, and preferably the evaporation is carried a little further in this drum by blowing in hot air through the pipe G. The culture may be best made from a small portion of the milk drawn out of the tank A after it has been treated there sufficiently to sterilize it. Thus a very pure culture is obtained. From the drum K the mass is placed in the ripening-room H on shelves J. The material may be quite soft when first removed from the drum, in which case it should be placed in wooden vessels closed to prevent the evaporation of the water and allowed to stand until it stiffens sufficiently to maintain its shape, after which it may bandaged, as with ordinary cheese-cloth rendered impervious to prevent cracking, and transferred to the ripening-room. The conditions in this room as to light, air, and temperature depend on the character of cheese to be produced, the temperature varying from below 32° Fahrenheit to 50° for different kinds of cheese. I preferably maintain a temperature below 40° Fahrenheit in order to hinder the generation of carbon dioxid and the consequent loss of sugar and puffiness of the product. For Roquefort cheese, for example, it is best to use a dark room and to exclude air by wrapping the cheese. This cheese will ordinarily ripen in about four months; but the time varies greatly for different cheeses, some requiring as long as a year. The manner of caring for the cheese in the ripening-room does not vary in my product from that ordinarily observed in making other cheeses.

In Fig. 1, K indicates a blower for supplying air to the tank and drum, L being a coil passing through a steam-chamber for supplying heated air, and M being an inlet for unheated air.

Though I have described with great particularity of detail a product and process embodying my invention, yet it is to be understood that the invention is not limited to the specific features described. Various other embodiments thereof may be introduced by those skilled in the art without departure from the invention. For example, my invention contemplates and includes also, in making cheese including fat, first reducing skim-milk or partly-skimmed milk to the desired consistency and then adding fat to suit the product desired.

My invention includes also the use of other fats than milk-fat—such, for example, as those used in filled or margarin cheese—and these may be introduced in the beginning or at a later stage as described for milk-fat.

What I claim is—

1. A ripened milk product resembling cheese and containing a considerable percentage of the sugar of the original milk.

2. A ripened milk product resembling cheese and containing substantially all the proteids of the original milk in substantially as soluble and digestible condition as in the original milk.

3. A ripened milk product resembling cheese and containing a considerable percentage of the sugar of the original milk, and substantially all the proteids.

4. A ripened milk product resembling cheese and containing a considerable percentage of the sugar of the original milk, and substantially all the proteids and a desired proportion of fat.

5. A ripened milk product resembling cheese and containing the following ingredients in substantially the proportions stated: fat twenty parts, proteids seventeen and one-half parts, milk-sugar (including its fermentation products) twenty-two and one-half parts, water twenty to forty parts.

6. The process of treating milk which consists in forming a mixture of milk solids including substantially all the milk-sugar with a reduced proportion of water, and ripening the mixture to produce a product resembling cheese.

7. The process of obtaining from milk a product resembling cheese which consists in forming a mixture of milk solids including substantially all the proteids in substantially as soluble condition as in the original milk, and a reduced proportion of water, and ripening the mixture.

8. The process of obtaining from milk a product resembling cheese which consists in evaporating a portion of the water thereof at a temperature below the coagulating-point of albumen and ripening the remaining mass.

9. The process of treating milk which consists in evaporating a portion of the water thereof by heating and blowing air through it, and ripening the remaining mass to produce a product resembling cheese.

10. The process of obtaining from milk a product resembling cheese which consists in forming a mixture of milk solids including substantially all the milk-sugar with a reduced proportion of water, adding bacteria to produce a desired flavor, and ripening the mass.

11. The process of obtaining from milk a product resembling cheese which consists in evaporating a portion of the water thereof at a temperature below the coagulating-point of albumen, adding bacteria to produce a desired flavor, and ripening the mass.

12. The process of obtaining from milk a product resembling cheese which consists in evaporating a portion of the water thereof at a temperature below the coagulating-point of albumen and sterilizing, adding bacteria to produce a desired flavor, and ripening the mass.

In witness whereof I have hereunto signed my name in the presence of two subscribing witnesses.

JOSEPH H. CAMPBELL.

Witnesses:
   THOMAS F. WALLACE,
   FRED WHITE.